(12) United States Patent
Cox et al.

(10) Patent No.: US 6,947,955 B2
(45) Date of Patent: Sep. 20, 2005

(54) RUN-TIME AUGMENTATION OF OBJECT CODE TO FACILITATE OBJECT DATA CACHING IN AN APPLICATION SERVER

(75) Inventors: John S. Cox, Apex, NC (US); Gennaro A. Cuomo, Apex, NC (US); Erik Alan Daughtrey, Durham, NC (US); Brian Keith Martin, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 493 days.

(21) Appl. No.: 10/252,323

(22) Filed: Sep. 23, 2002

(65) Prior Publication Data

US 2004/0059748 A1 Mar. 25, 2004

(51) Int. Cl.$^7$ .............................................. G06F 17/30
(52) U.S. Cl. ...................... 707/104.1; 707/102; 717/162
(58) Field of Search ............................ 707/104.1, 102; 717/162

(56) References Cited

U.S. PATENT DOCUMENTS

| | | | |
|---|---|---|---|
| 5,448,727 A | * 9/1995 | Annevelink | 707/101 |
| 5,848,274 A | 12/1998 | Hamby et al. | 395/705 |
| 5,948,113 A | * 9/1999 | Johnson et al. | 714/38 |
| 5,987,529 A | * 11/1999 | Nakamura et al. | 719/328 |
| 6,052,515 A | 4/2000 | Bruckhaus | 395/500.02 |
| 6,081,665 A | 6/2000 | Nilsen et al. | 395/705 |
| 6,131,187 A | 10/2000 | Chow et al. | 717/5 |
| 6,163,780 A | 12/2000 | Ross | 707/101 |
| 6,327,624 B1 | 12/2001 | Mathewson, II et al. | 709/231 |
| 6,336,213 B1 | 1/2002 | Beadle et al. | 717/5 |
| 6,338,160 B1 | 1/2002 | Patel et al. | 717/5 |
| 6,339,841 B1 | 1/2002 | Merrick et al. | 717/10 |
| 6,349,344 B1 | 2/2002 | Sauntry et al. | 709/332 |
| 6,366,949 B1 | 4/2002 | Hubert | 709/206 |
| 6,792,607 B1 | * 9/2004 | Burd et al. | 719/316 |
| 2001/0025373 A1 | 9/2001 | Gebhart et al. | 717/7 |
| 2001/0047510 A1 | 11/2001 | Angel et al. | 717/4 |
| 2002/0038301 A1 | 3/2002 | Aridor et al. | 707/10 |
| 2002/0147652 A1 | * 10/2002 | Gheith et al. | 705/26 |
| 2002/0156792 A1 | * 10/2002 | Gombocz et al. | 707/100 |
| 2003/0187743 A1 | * 10/2003 | Kumaran et al. | 705/26 |

OTHER PUBLICATIONS

Andre et al, Optimizing Method Search with Lookup Caches and Incremental Coloring, 1992 ACM 0–89791–539–9, OOPSLA '9 pp. 110–126.*

I. Welch, et al., *Kava—A Reflective Java Based on Bytecode Rewriting*, Springer LINK: Lecture Notes in Computer Science 1826, <http://link.springer.de/link/service/series/0558/bibs/1826/18260155.htm>, (2000).

G. A. Cohen, *The JOIE Environment*, <http://www.cs.duke.edu/ari/joie/html/node7.html>, (Apr. 28, 1998).

D. Leberknight, et al., *Part X: UML State Diagrams, Object–Oriented Programming & Design*, Univ. of Colorado at Boulder, Dept. of Computer Science, CSCI 4448, Spring 2002.

K. M. Anderson, *Lecture 27: OO Design Paterns, Object–Oriented Analysis and Design*, Univ. of Colorado at Boulder, Dept. of Computer Science, CSCI 6448—, (Apr. 24, 2001).

* cited by examiner

*Primary Examiner*—Wayne Amsbury
(74) *Attorney, Agent, or Firm*—Christopher & Weisberg P.A; A. Bruce Clay

(57) ABSTRACT

An object state caching method can include augmenting a compiled object having at least one referenced method with conditional caching logic. The conditional caching logic can be executed in an execution environment to determine whether to execute the referenced method. If the conditional caching logic determines not to execute the referenced method, the execution of the referenced method can be bypassed. Additionally, the stored object state can be retrieved from a communicatively coupled object cache. Finally, the retrieved object state can be forwarded to a requesting process. If, however, the conditional caching logic determines to execute the referenced method, the referenced method can be executed producing the resultant object state, and, the resultant object state can be cached in the coupled object cache.

6 Claims, 4 Drawing Sheets

RUN-TIME AUGMENTATION OF OBJECT CODE TO FACILITATE OBJECT DATA CACHING IN AN APPLICATION SERVER

BACKGROUND OF THE INVENTION

1. Statement of the Technical Field

The present invention relates to the field of data caching and more particularly to object data caching in an application server.

2. Description of the Related Art

In the technical field of object oriented computing, the composite values of all attributes and links held by an object instance can represent the identity of the object instance. Notably, the state of an object instance can be derived from this identity. Also, external events can cause the state of an object instance to change. In that regard, the transition from one object instance state to another can be modeled as a finite state machine whose transitions can occur essentially in an instantaneous manner.

The command design pattern has been used to build object instances whose behavior can vary depending upon the type of the object. In particular, in the command design pattern, the behavior of an object instance can vary while the interface can remain constant. Often in the command design pattern, a single method can be provided in the object instance which can be invoked by the same name, regardless of the implementation of the interface. In consequence, those who would implement the command design pattern would do so to maintain the state of an object instance.

Like other data and processing elements of a distributed computer program, the state of an object instance can be cached when the object has been deployed through an application server. Specifically, one can instrument an object for caching within the object cache of an application server. Also, one can code an application server to perform object state caching. Still, to instrument an object for caching would require access to the source code of the object. Additionally, including caching as part of the functionality of an object which has implemented the command design pattern would stray from the intent and specification of the command design pattern.

Similarly, to configure an application server to specifically undertake caching of the state of an object instance can require access to the source code of the application server. Additionally, to the extent that a distributed application requires specific cache processing, every possible application server which might deploy the distributed application would require retooling. Yet, different distributed applications might require different caching logic. Given the possibility of multiple object caching schemas for different distributed applications, it would not be feasible to incorporate multiple caching configurations across multiple application servers.

SUMMARY OF THE INVENTION

To address the inherent deficiencies of the prior art, an object state caching method, system and apparatus has been invented in which the state of an object instance can be cached without requiring either a specific configuration of an application server, or a modification of the source code of the object. Rather, in accordance with the inventive arrangements, the compiled code of the object instance can be augmented at the time of instantiation to specifically incorporate object state caching logic so as to not require the modification of the source code of either the application server or the object itself.

In one aspect of the invention, an object state caching method can include augmenting a compiled object having at least one referenced method with conditional caching logic. The conditional caching logic can be executed in an execution environment to determine whether to execute the referenced method. If the conditional caching logic determines not to execute the referenced method, the execution of the referenced method can be bypassed. Additionally, the stored object state can be retrieved from a communicatively coupled object cache. Finally, the retrieved object state can be forwarded to a requesting process. If, however, the conditional caching logic determines to execute the referenced method, the referenced method can be executed producing the resultant object state, and, the resultant object state can be cached in the coupled object cache.

Notably, the caching step can include detecting an exception during the execution of the referenced method; and, responsive to the detection, bypassing the caching step. Similarly, the caching step can include detecting an exception during the execution of the referenced method and identifying the detected exception. A table of exceptions can be consulted to determine whether despite the identified exception, the resultant object state can be cached. If the table of exceptions permits caching of the resultant object state despite the identified exception, the caching step can be performed. In contrast, if the table of exceptions does not permit caching of the resultant object state despite the identified exception, the caching step can be bypassed.

An object cache enabled application server can include an application server coupled to an object cache; at least one execution environment and corresponding object loader disposed in the application server. Conditional caching logic can be pre-configured for insertion in a compiled object. In consequence, an object augmentation process can be coupled to the object loader and configured to augment object code of a compiled object with the conditional caching logic. Notably, the execution environment can be a Java virtual machine and the corresponding object loader can be a class loader.

A class loader configured for operation with a Java virtual machine in an application server can include class loading logic; conditional caching logic pre-configured for insertion in a Java class; and, an object augmentation process coupled to the class loading logic and configured to augment byte code of the Java class with the conditional caching logic.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

In accordance with the inventive arrangements, the compiled code of an object can be augmented at run-time to include object state caching logic. Specifically, at the time when an application server locates and loads an instance of the object, a method by which the state of the object can be affected can be located and conditional logic can be inserted to regulate the execution of the method. More particularly, the conditional logic can query an object data cache to determine whether the object data cache holds a valid cache entry for the object. If so, the conditional logic can bypass the method and can retrieve the cached state for the object. Otherwise, the conditional logic can permit the execution of the method, however, the conditional logic can require that the object state be cached to the object data cache at the conclusion of the execution of the method.

Figure 1:
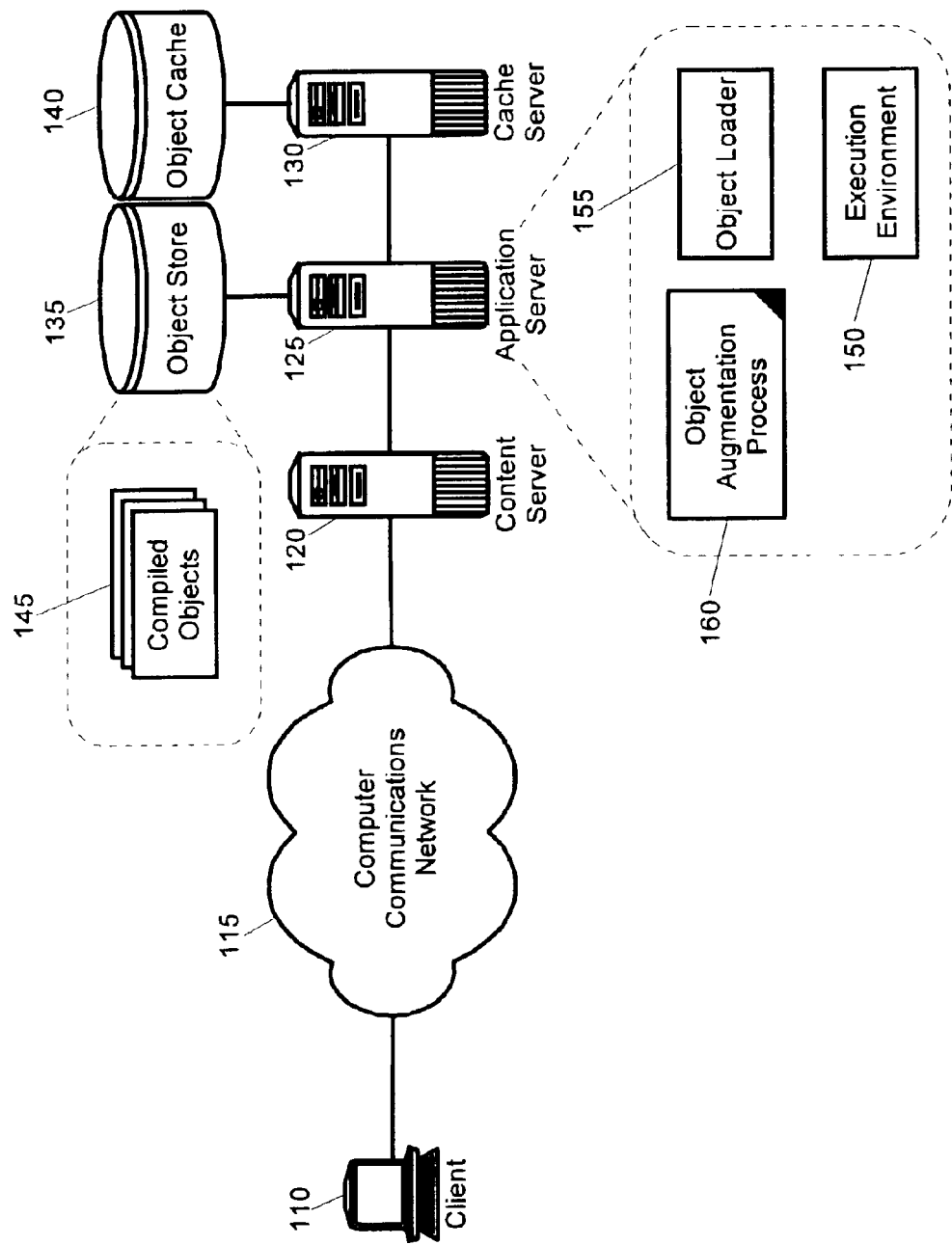
FIG. 1 is schematic illustration of a distributed application system in which the compiled code of an object instance can be augmented at the time of instantiation to accommodate conditional caching logic.

FIG. 1 is schematic illustration of a distributed application system in which the compiled code of an object instance can be augmented at the time of instantiation to accommodate conditional caching logic. Specifically, the distributed application system can include a content server 120 configured to respond to content requests received from requesting clients 110 over the computer communications network 115. The content server 120 can be communicatively coupled to both an application server 125 and a cache server 130. One skilled in the art will recognized, however, that each of the content server 120, application server 125 and cache server 130 can be integrated within a single computing device as either separate or unified processes, or across multiple computing devices as either separate or unified processes.

The cache server 130 can be configured to store object instances within an object cache 140. Also, the cache server 130 can be configured to manage the stored object instances including the regulation of expiring cache entries and the refreshing of the same. The cache server 130 further can be configured to serve cached object instances from the object cache 140 to requesting processes such as those which operate within the application server 125. In particular, the application server 125 can host the execution of objects stored within an object store 135. In that regard, the objects stored within the object store 135 can include compiled objects such as class files or other such application objects.

The application server 125 can include both an object loader 155 and an execution environment 150. While the execution environment 150 can host instances of application objects, the object loader 155 can load such instances of application objects for execution within the execution environment. In the circumstance where the application server 125 is a Java™-based application server, the execution environment can be a Java virtual machine, and the object loader can be a class loader. Application servers are well-known in the art and can include, for instance, the Websphere™ Advanced Server manufactured by International Business Machines Corporation of Armonk, N.Y., United States.

Importantly, an object augmentation process 160 can be included in the application server 125. For instance, the object augmentation process 160 can be included as part of the object loader 155, or as a stand alone process which can be accessed in the course of the object loader 155 locating and loading instances of compiled objects. In any case, the object augmentation process 160 can augment the compiled code of an object so as to include conditional caching logic. Specifically, the compiled code for a method responsible for object state transitions can be wrapped with conditional code which will permit the execution of the method only where the resultant state of the object cannot first be retrieved from the object cache 140. Where the object cannot first be retrieved from the object cache 140, the method can be permitted to execute, however, the resultant state can be stored into the object cache 140 in accordance with the instruction of the conditional caching logic.

Notably, where the compiled objects loaded by the object loader 155 are Java classes, the object augmentation process 160 can be incorporated within a class loader. Moreover, as compiled Java classes are serialized arrangements of byte-code, in the circumstance where the compiled objects are Java classes, the object augmentation process 160 can augment the byte-code of the Java classes to include instructions which, collectively, comprise the conditional caching logic. Significantly, byte-code augmentation is a technique which is well-known among skilled artisans and provides significant advantages in the context of enhancing the functionality of compiled objects without requiring a modification of the sources code which underlies the functionality of the compiled objects.

Figure 2:
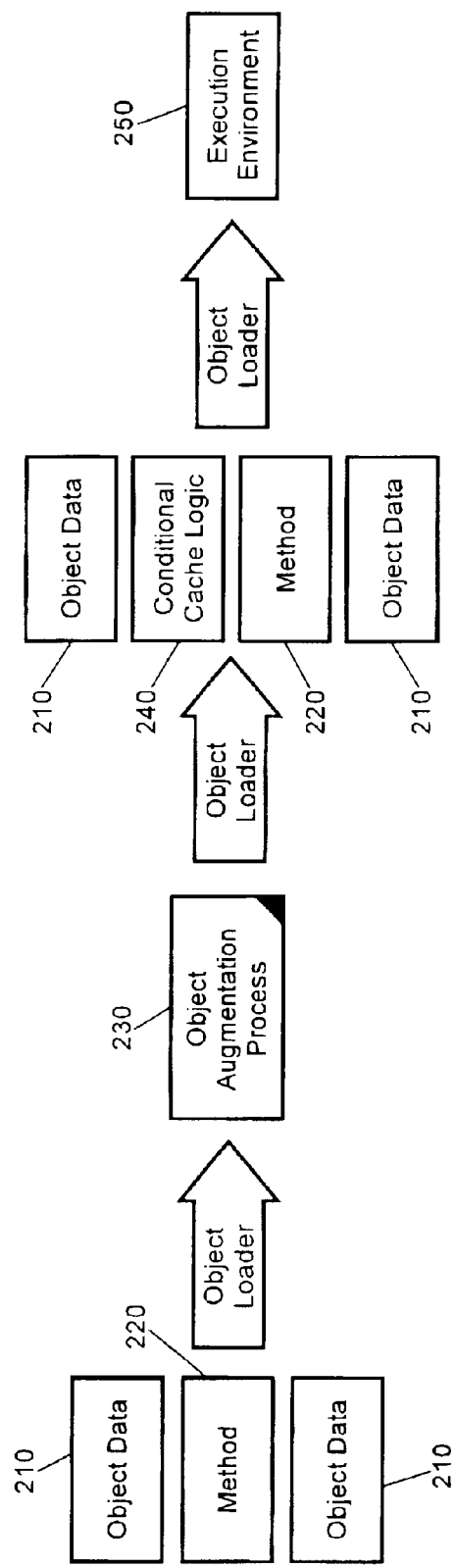
FIG. 2 is a block diagram of a process of augmenting a compiled object with conditional caching logic.

FIG. 2 is a block diagram of a process of augmenting a compiled object with conditional caching logic. As shown in FIG. 2, the compiled object can include both object data 210 and a singular method 220. In that regard, where the compiled object is an implementation of the well-known command design pattern, it can be assumed that only one method has been included within the compiled object. In any case, upon an attempt to invoke the method 220 of the compiled object, external information can be used to determine whether the compiled object (or a method included within the compiled object) should be augmented to include conditional caching logic. Based on a determination that the compiled object should be augmented, the object loader can forward the compiled object to the object augmentation process 230 of the present invention.

The object augmentation process 230 can locate the code portion of the compiled object which relates to the invoked method and can insert therearound conditional cache logic 240 before forwarding the modified compiled object to the execution environment 250. As noted, the conditional cache logic 240 can regulate the execution of the method 220 depending upon whether the state of the compiled object can be retrieved from the object cache without requiring the execution of the method. To the extent that the state of the compiled object cannot be retrieved from the object cache, the method 220 can be permitted to execute in the execution environment 250, however, the conditional cache logic 240 can cache the resultant state to the object cache.

Figure 3A:
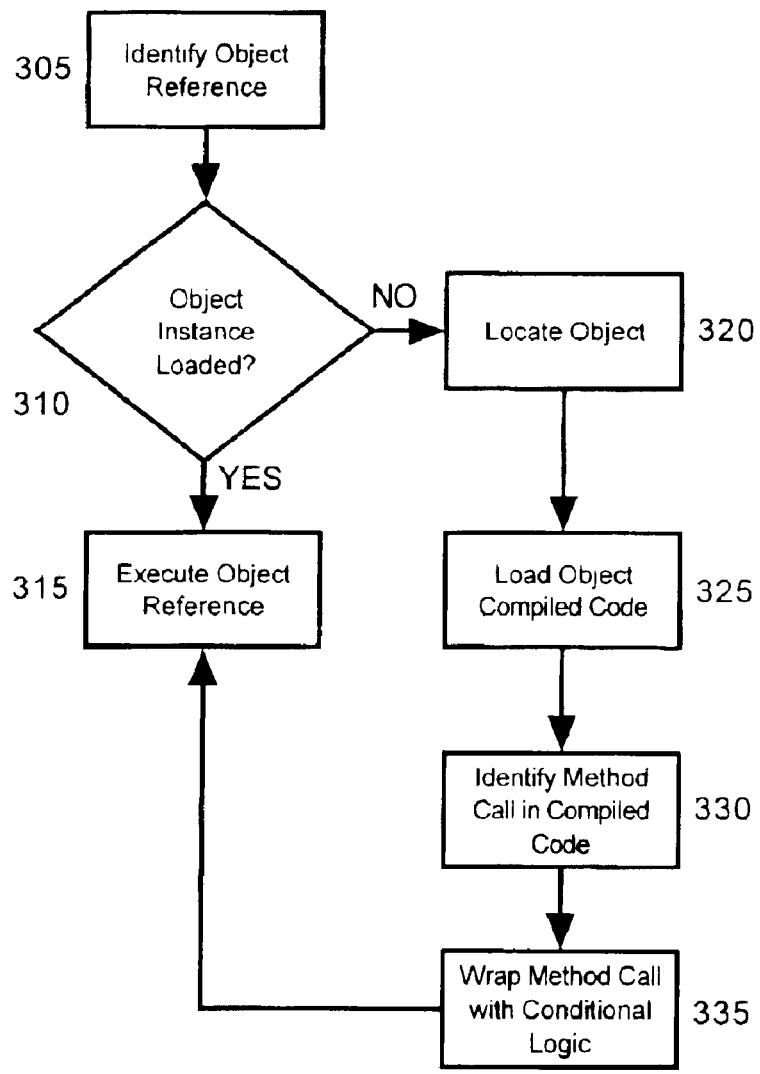
FIG. 3A is a flow chart illustrating a process of augmenting a compiled object with conditional caching logic; and, FIG. 3B is a flow chart illustrating a process of selectively caching the state of an object instance to an object cache in an augmented compilation of the object in accordance with one aspect of the present invention.

FIG. 3A is a flow chart illustrating a process of augmenting a compiled object with conditional caching logic. Beginning in block 305, a reference to an object can be identified, for instance in reference to an already instantiated object instance. In block 310, it can be determined whether an object instance has already been loaded so that the reference to the object can be resolved therein, or whether the object instance has yet to be invoked which would require the location and instantiation of the referenced object. If an object instance already exists, the reference can be resolved directly within the existing object instance in block 315.

By comparison, if an object instance does not already exist, in block 320, the object can be located. In particular, the object can be located locally within the domain of the application server, or remotely within the domain of an application object store. In any case, in block 325 the object loader can load the compiled object. In particular, where the compiled object is a Java class, the object loader can load the serialized byte-sequence forming the compiled object. In block 330, a specific code portion implementing the sole referenced method of the compiled object can be identified within the code of the compiled object. Finally, in block 335 the specific code portion can be wrapped with the conditional caching logic of the present invention.

Figure 3B:
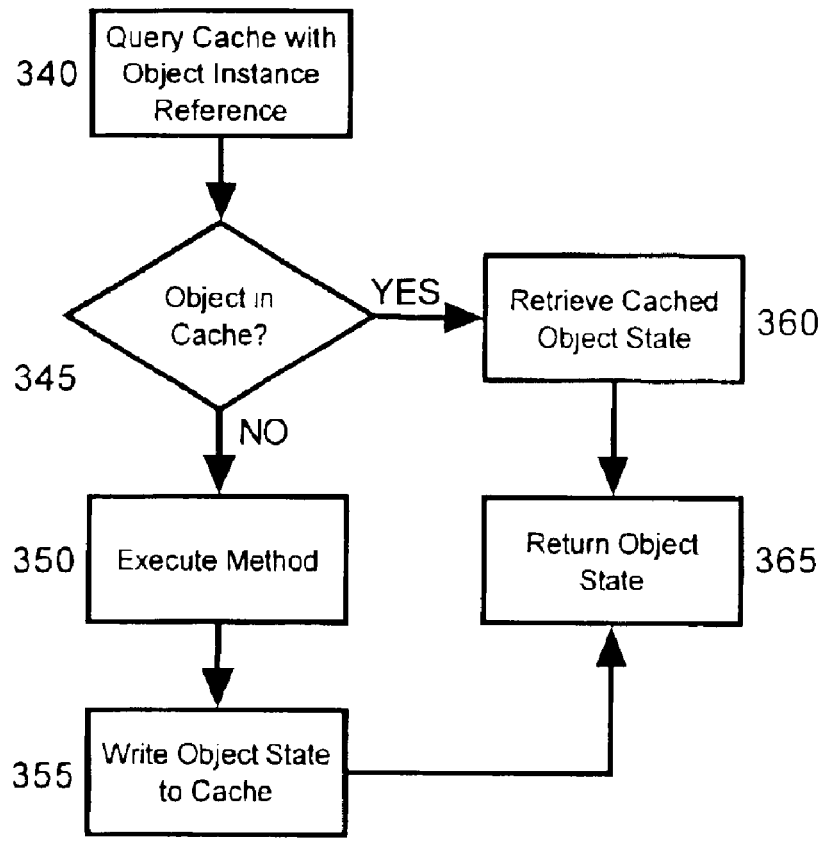

Once the specific code portion of the compiled object has been wrapped with the conditional caching logic, the modified compiled object can be forwarded to an execution environment for execution. FIG. 3B is a flow chart illustrating a process of selectively caching the state of an object instance to an object cache in an augmented compilation of the object in accordance with one aspect of the present invention. Specifically, beginning in block 340, the conditional logic can query an object cache with a reference to the object itself. In block 345, if the object cache returns a positive hit on the object itself, in block 360 the state of the object as stored in the cache can be retrieved and in block 365 the retrieved state can be forwarded to the calling process.

If, however, in block 345, the object cache fails to locate a fresh version of the object state, in block 350 the method of the object can be permitted to execute. Subsequently, in block 355 the resultant state of the object can be written to the object cache. Finally, in block 365 the resultant object state can be forwarded to the calling process. Notably, in one aspect of the present invention, exception handling also can be provided during the code augmentation process so that when an exception occurs, the state of the object cannot be written to the object cache. In yet a more comprehensive implementation, selection logic can be provided with which some exceptions are not deemed to disqualify the caching of the object state, while other exceptions are considered to disqualify the object state from caching.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An object state caching method, comprising the steps of:

augmenting a compiled object comprising at least one referenced method with conditional caching logic;

executing said conditional caching logic in an execution environment to determine whether to execute said referenced method;

if said conditional caching logic determines not to execute said referenced method, bypassing execution of said referenced method, retrieving a stored object state from a communicatively coupled object cache, and forwarding said retrieved stored object state to a requesting process; and, if said conditional caching logic determines to execute said referenced method, executing said referenced method, said execution producing said resultant object state, and, caching said resultant object state in said coupled object cache.

2. The method of claim 1, wherein said caching step comprises the steps of:

detecting an exception during said execution of said referenced method; and, responsive to said detection, bypassing said caching step.

3. The method of claim 1, wherein said caching step comprises the steps of:

detecting an exception during said execution of said referenced method;

identifying said detected exception;

consulting a table of exceptions to determine whether despite said identified exception, said resultant object state can be cached; and, if said table of exceptions permits caching of said resultant object state despite said identified exception, performing said caching step, but if said table of exceptions does not permit caching of said resultant object state despite said identified exception, bypassing said caching step.

4. A machine readable storage having stored thereon a computer program for object state caching, said computer program comprising a routine set of instructions which when executed cause the machine to perform the steps of:

augmenting a compiled object comprising at least one referenced method with conditional caching logic;

executing said conditional caching logic in an execution environment to determine whether to execute said referenced method:

if said conditional caching logic determines not to execute said referenced method, bypassing execution of said referenced method, retrieving a stored object state from a communicatively coupled object cache, and forwarding said retrieved stored object state to a requesting process; and, if said conditional caching logic determines to execute said referenced method, executing said referenced method, said execution producing said resultant object state, and, caching said resultant object state in said coupled object cache.

5. The machine readable storage of claim 4, wherein said caching step comprises the steps of:

detecting an exception during said execution of said referenced method; and, responsive to said detection, bypassing said caching step.

6. The machine readable storage of claim 4, wherein said caching step comprises the steps of:

detecting an exception during said execution of said referenced method;

identifying said detected exception;

consulting a table of exceptions to determine whether despite said identified exception, said resultant object state can be cached; and, if said table of exceptions permits caching of said resultant object state despite said identified exception, performing said caching step, but if said table of exceptions does not permit caching of said resultant object state despite said identified exception, bypassing said caching step.

* * * * *